United States Patent
Silvester

(10) Patent No.: US 7,120,444 B2
(45) Date of Patent: Oct. 10, 2006

(54) METHOD AND APPARATUS TO PROVIDE GUIDANCE TO SUPPORT WIRELESS CONNECTIVITY

(75) Inventor: Kelan C. Silvester, Portland, OR (US)

(73) Assignee: Intel Corporation, Santa Clara, CA (US)

(*) Notice: Subject to any disclaimer, the term of this patent is extended or adjusted under 35 U.S.C. 154(b) by 573 days.

(21) Appl. No.: 10/039,583

(22) Filed: Dec. 31, 2001

(65) Prior Publication Data

US 2003/0125043 A1 Jul. 3, 2003

(51) Int. Cl.
*H04Q 7/20* (2006.01)

(52) U.S. Cl. .............................. 455/452.2; 455/456.6; 455/456.1; 342/357.13; 701/209; 701/211

(58) Field of Classification Search ............. 455/456.6, 455/456.1, 457, 423, 67.11, 421, 566, 134, 455/133, 456.2; 342/357.13; 701/209, 211, 701/205
See application file for complete search history.

(56) References Cited

U.S. PATENT DOCUMENTS

| | | | |
|---|---|---|---|
| 6,038,444 A * | 3/2000 | Schipper et al. ............ 455/421 |
| 6,084,543 A * | 7/2000 | Iizuka .................... 342/357.13 |
| 6,658,353 B1 * | 12/2003 | Shimizu et al. ............. 701/214 |
| 6,751,443 B1 * | 6/2004 | Haymes et al. .......... 455/67.11 |
| 2001/0016489 A1 * | 8/2001 | Haymes et al. ............. 455/423 |
| 2002/0042269 A1 * | 4/2002 | Cotanis ....................... 455/423 |
| 2002/0049064 A1 * | 4/2002 | Banno ......................... 455/456 |

* cited by examiner

*Primary Examiner*—Danh Cong Le
(74) *Attorney, Agent, or Firm*—Blakely, Sokoloff, Taylor & Zafman LLP

(57) ABSTRACT

For one embodiment of the present invention, a cell phone may provide a wireless connection. The cell phone may additionally include a locator to indicate an approximate location of the cell phone. The cell phone may additionally include an output device to provide the user with a directional indicator to guide the user along a route that reduces the probability of losing the wireless connection.

18 Claims, 4 Drawing Sheets

METHOD AND APPARATUS TO PROVIDE GUIDANCE TO SUPPORT WIRELESS CONNECTIVITY

The present invention relates to computer systems and more particularly to providing a wireless electronic device with the ability to guide a user along a route that reduces the probability that the user will lose a wireless connection.

BACKGROUND

Computer systems are becoming increasingly pervasive in our society, including everything from small handheld electronic devices, such as personal data assistants and cellular phones, to application-specific electronic devices, such as set-top boxes, digital cameras, and other consumer electronics, to medium-sized mobile systems such as notebook, sub-notebook, and tablet computers, to desktop systems, workstations, and servers. A cell phone is a particularly useful computer system that provides a convenient way not only for users to be contacted but also for users to contact others.

Cell phones rely on a network of cell towers to provide wireless services. Each tower typically serves a coverage area referred to as a cell. Generally, as a user moves away from a first cell tower of a first cell, the wireless signal strength may decrease until the user moves into a second cell and moves toward the second tower serving the second cell. Occasionally, a user may move into a region that either lacks wireless signal coverage or provides very weak wireless signal strength. This may occur when, for example, a cell tower is malfunctioning, no cell tower exists to cover a particular area, or the wireless signal is somehow obstructed. Regions such as these may be referred to as holes or dead zones.

The probability that the wireless connection may be lost between the cell phone and the cell tower increases when the cell phone user (and, hence, the cell phone itself) passes through a hole. This can result in dropped calls. The present invention addresses this and other problems associated with the prior art.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, a cell phone may provide a user with a wireless connection. The cell phone may include a locator to indicate an approximate location of the cell phone. The cell phone may additionally include an output device, such as a video display screen, to provide the user with a directional indicator to guide the user along a route that reduces the probability of losing the wireless connection. For example, the route may be designed to avoid wireless signal holes.

A more detailed description of embodiments of the present invention, including various configurations and implementations, is provided below.

Figure 1:
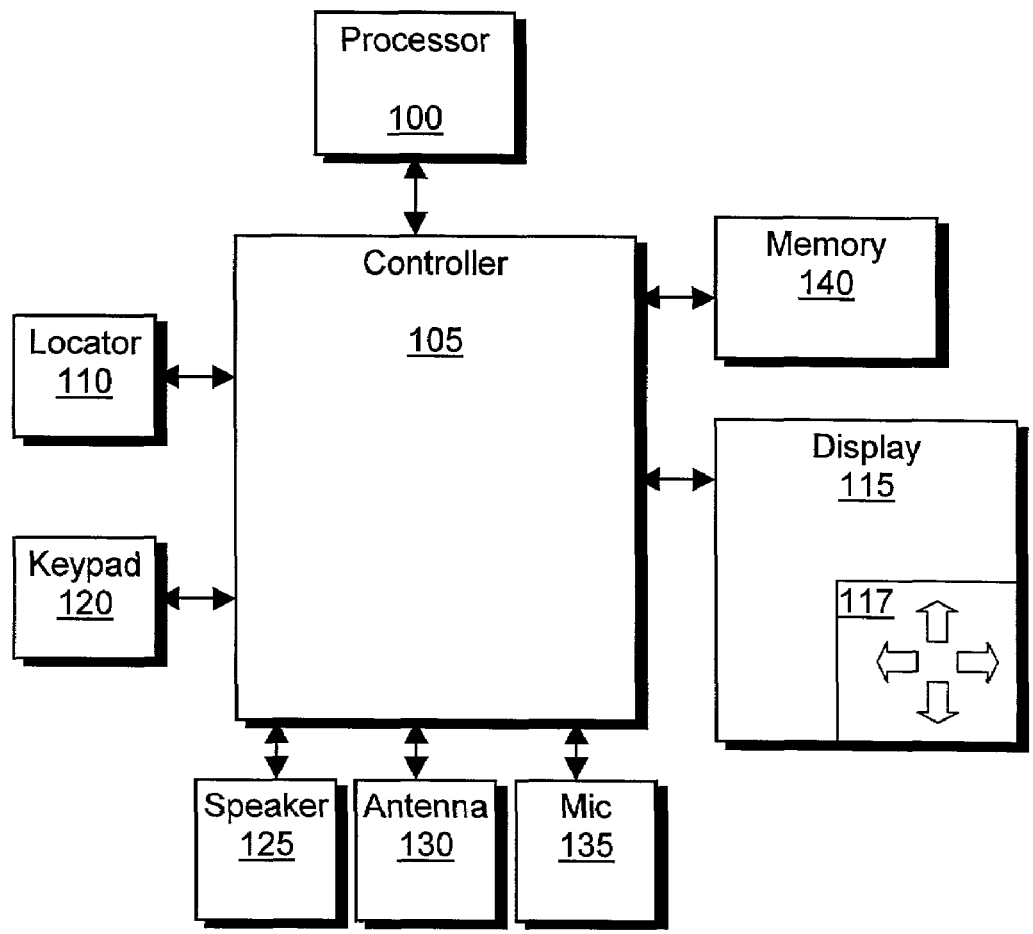
FIG. 1 includes a computer system formed in accordance with an embodiment of the present invention.

FIG. 1 shows a cell phone including processor 100. Processor 100 may communicate with locator 110, keypad 120, speaker 125, antenna 130, microphone 135, display 115, and memory 140 via controller 105. In accordance with an embodiment of the present invention, a cell phone may include more or fewer components than those shown in FIG. 1, and the components of FIG. 1 may be partitioned differently. For example, multiple components may be integrated into a single component, and single components may be divided into multiple components. Note that the term "processor" may be used herein to refer to one or more of a central processing unit, a processor of a symmetric or asymmetric multiprocessing system, a digital signal processor, a micro-controller, etc.

For one embodiment of the present invention, speaker 125 of FIG. 1 may be an earpiece and microphone 135 may be a mouthpiece of the cell phone. For one embodiment, keypad 120 and display 115 may be combined into a single touch-sensitive display. Alternatively, some or all of the functions provided by keypad 120 may be implemented using voice-activated commands.

Memory 140 may include any machine-readable medium such as a magnetic disk (e.g. a hard drive or floppy disk), an optical disk (e.g. a CD or DVD), or a semiconductor device (e.g. Flash, EPROM, or RAM). For one embodiment of the present invention, memory 140 may be bifurcated into a volatile memory region and a nonvolatile memory region. The volatile memory region may be used by the cell phone as a high-speed, temporary storage space when the cell phone is turned on, and the nonvolatile memory region may be used as a long-term storage space for use when the cell phone is turned off. A method of an embodiment of the present invention may be implemented by the cell phone of FIG. 1 programmed to execute instructions associated with the method. These instructions may reside, at least in part, in memory 140.

Note that the term "cell phone," as used herein, is intended to broadly cover any wireless communication device, including, for example, a car phone, satellite phone, pager, etc. These wireless devices, which may be used in conjunction with embodiments of the present invention, may operate in accordance with any of a number of wireless networks in accordance with any of a number of wireless communication protocols. For example, a cell phone, as the term is used herein, may be a personal data assistant with a wireless network connection operating on a wireless local area network (LAN).

For one embodiment of the present invention, locator 110 of FIG. 1 may provide information that indicates an approximate geographic location of the cell phone. For example, the locator may include a global positioning system (GPS). For an alternate embodiment, the locator may include an alternate positioning system to provide location information relative to one or more known, fixed points, such as a cell tower or other wireless access transceivers.

In accordance with one embodiment of the present invention, display 115 may include directional indicator 117 of FIG. 1. Directional indicator 117 may be used to guide the cell phone user along a route that reduces the probability of losing the wireless connection. In other words, directional indicator 117 may guide the cell phone user along a route that avoids wireless holes, thereby improving wireless signal strength.

For one embodiment of the present invention, indicator 117 may include a set of directional arrows, as shown in FIG. 1, to guide the user. For example, a directional arrow pointing toward the right may indicate that the cell phone user, to maintain or improve their wireless signal strength, should travel to the right (e.g. by foot or car). A directional arrow pointing down may indicate that the user should turn around and travel in the opposite direction. Similarly, a directional arrow pointing up or left may guide the user forward or to the left, respectively.

Alternatively, the directional indicator may be any other audio or video cue indicating the route to improved wireless signal strength. For example, the indicator may include a map showing the route. Alternatively, the indicator may include a homing signal, such as a flashing light, sound, or both, that indicates when the cell phone is pointed in the proper direction. Alternatively, the indicator may include a text-based guide providing directional instructions to the user (e.g. "proceed due south."). Alternatively, the indicator may include a vocal guide providing voice instructions to the user via speaker 125 of FIG. 1.

Figure 2A:
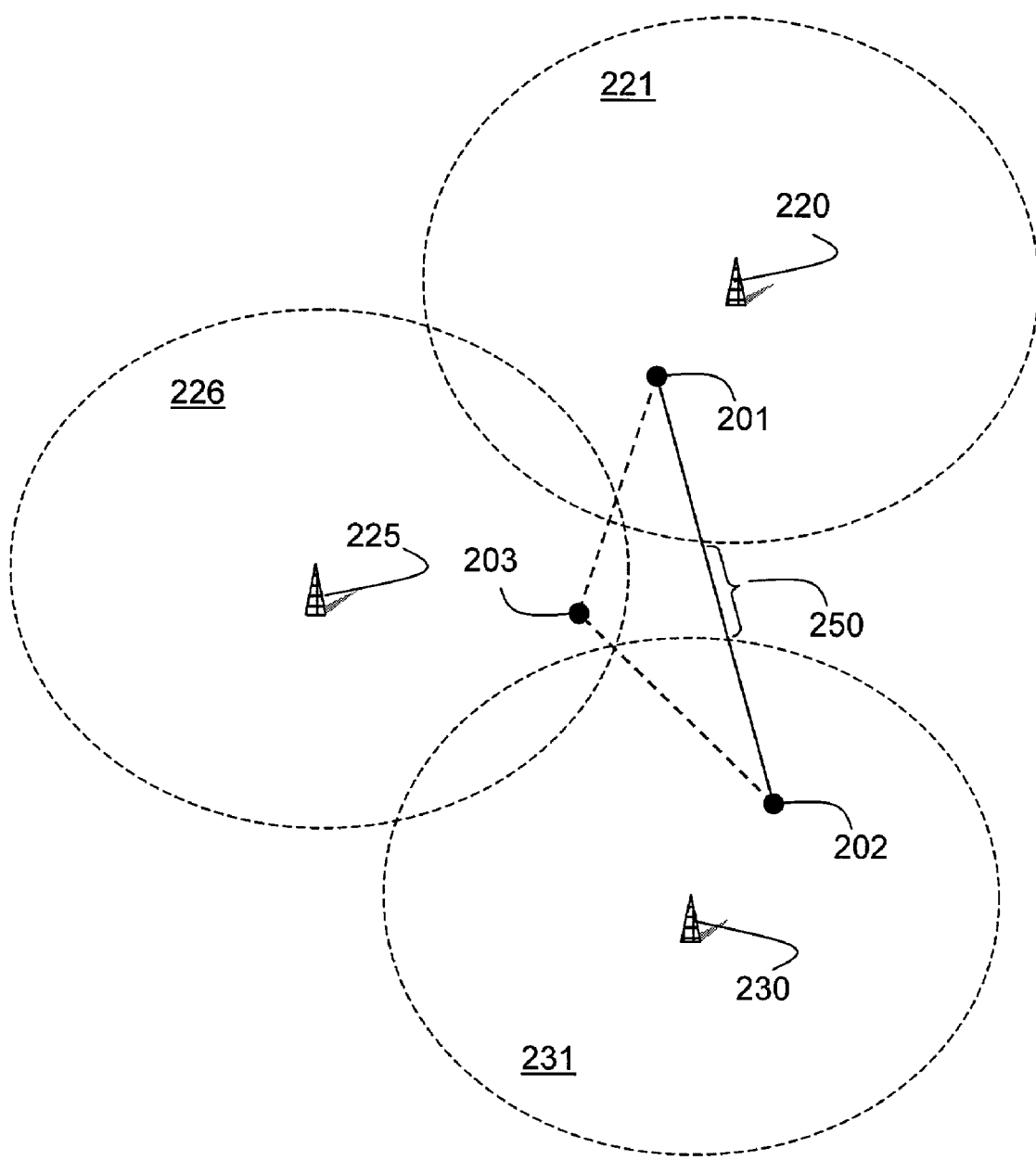
FIG. 2A includes a geographic region including cells and a route in accordance with one embodiment of the present invention.
Figure 2B:
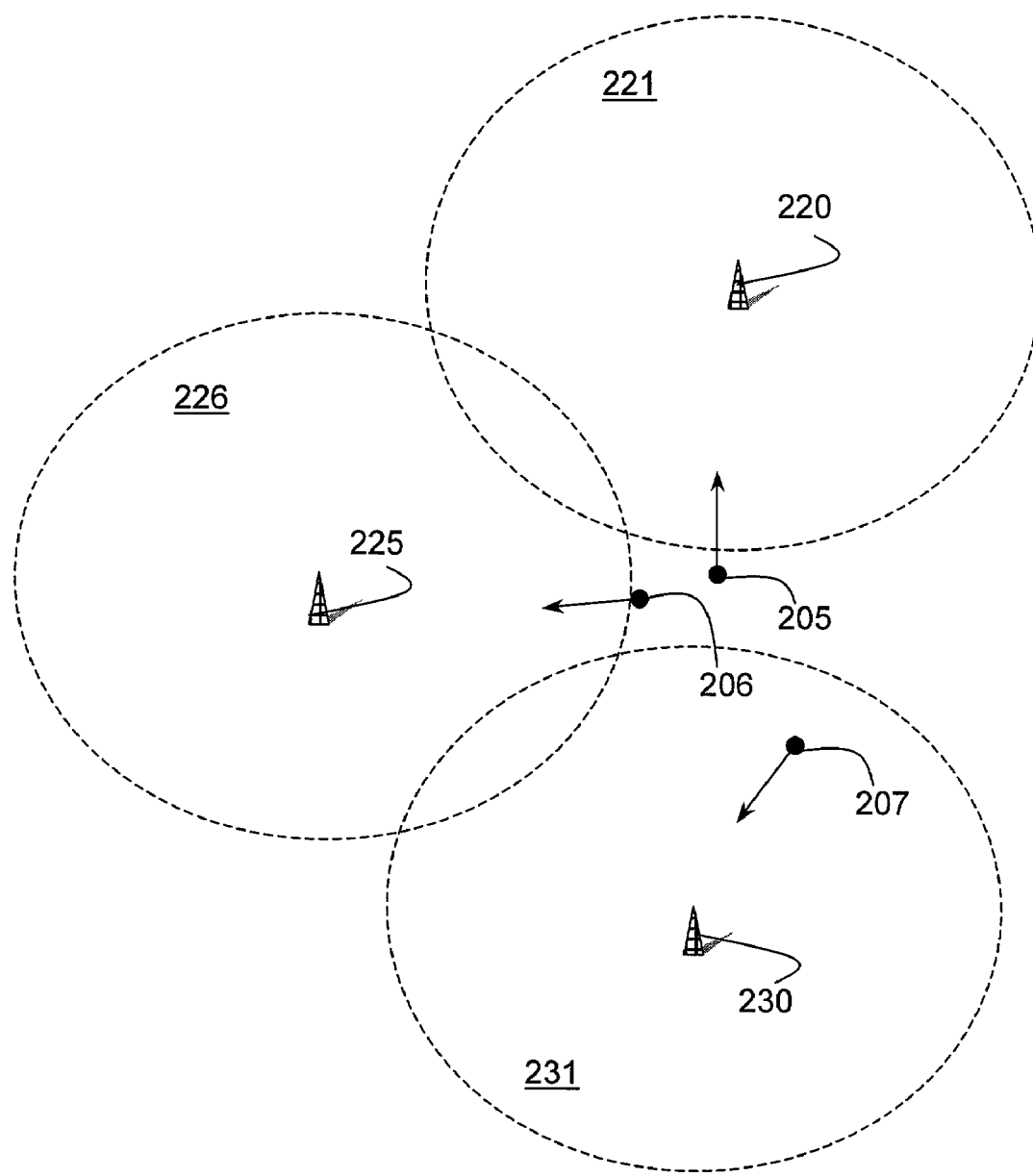
FIG. 2B includes the geographic region of FIG. 2A including cells and a route in accordance with another embodiment of the present invention.

FIGS. 2A and 2B include a geographic region, including cells 221, 226, and 231 serviced by cell towers 220, 225, and 230, respectively. Note that a portion of the area between cells 221 and 231 includes a cellular hole. Within this hole, there may be a high probability that a cell phone user will be unable to establish or maintain a wireless connection. In general, wireless signal strength tends to increase as the user moves closer to a cell tower. Operation of a cell phone, in accordance with embodiments of the present invention, within the geographic region of FIGS. 2A and 2B, is described in more detail below in conjunction with FIG. 3.

Figure 3:
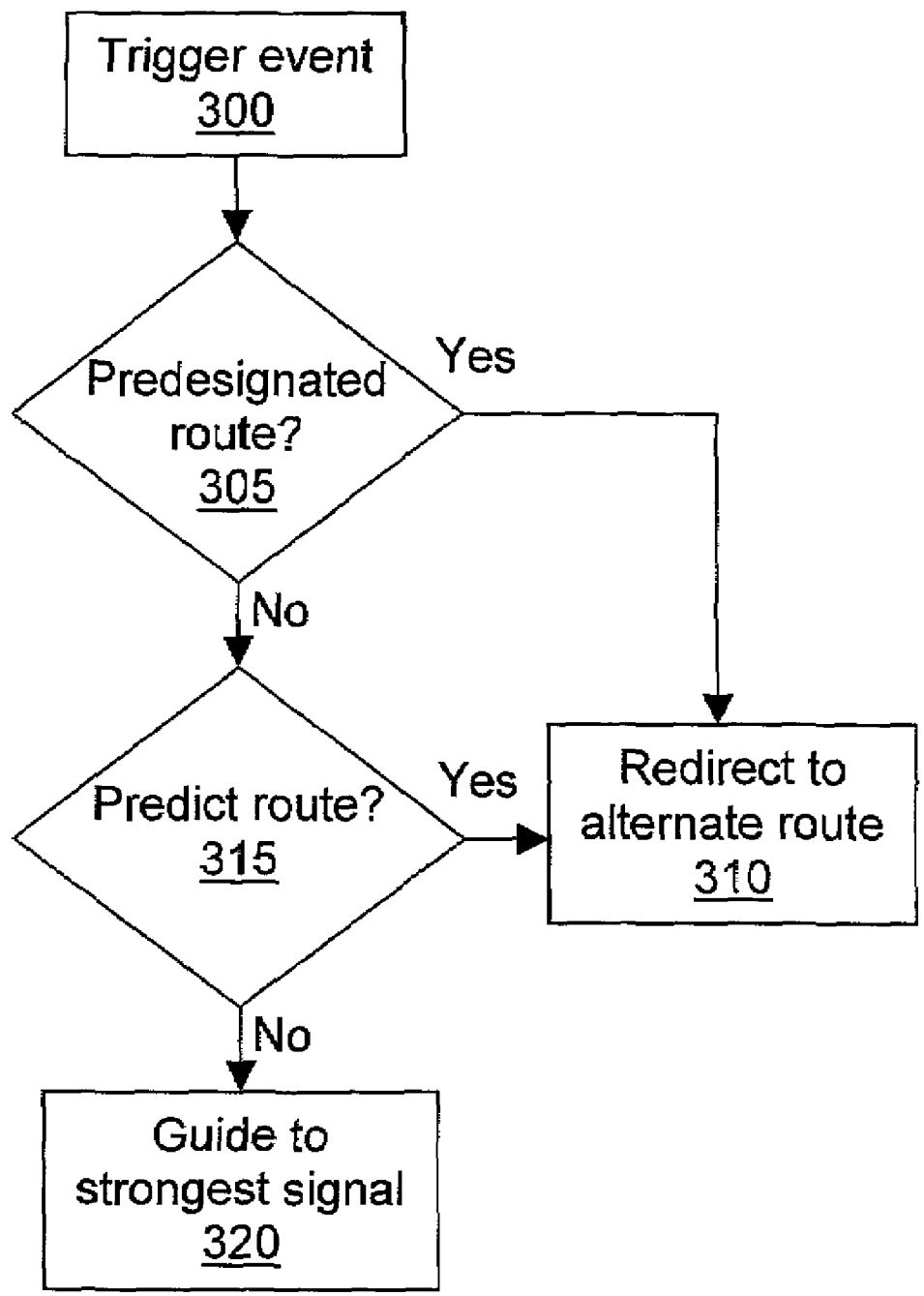
FIG. 3 includes a flow chart showing a method of an embodiment of the present invention.

FIG. 3 includes a flow chart showing a method of an embodiment of the present invention. A trigger event occurs at block 300. In accordance with an embodiment of the present invention, this trigger event may include initiating a wireless connection by a cell phone user by, for example, entering a phone number and pressing the "send" button on the cell phone. Alternatively, the trigger event may include the user pressing a button, or sequence of buttons, on a cell phone to request directional guidance for improved wireless signal strength. Alternatively, the trigger event may include a voice command from the user or the mere turning on of the cell phone. Alternatively, the trigger event may be a decrease in wireless signal strength. For example, the cell phone may guide the user along a route that improves wireless signal strength, in accordance with embodiments of the present invention, in response to a determination that a wireless connection may soon be lost due to inadequate signal strength.

In accordance with an embodiment of the present invention, once the trigger event occurs at block 300 of FIG. 3 it may be determined at block 305 if the user intends to travel along a predesignated route while communicating via a wireless connection. This embodiment may be found useful in an application in which the user has requested directions to a desired destination via the cell phone. For example, for an embodiment in which the cell phone is a wireless personal data assistant or a GPS-equipped car phone, the user may request the system to provide directions to a desired destination. The system may then determine a route to the desired destination and guide the user to that destination, using directional indicators, as the user travels. For this embodiment it may then be determined at block 305 that the user is traveling along the predesignated route. If so, the user may be redirected to an alternate route, if needed, at block 310. This alternate route may be a route that reduces the probability of losing the wireless connection.

For example, consider a user at point 201 of FIG. 2A. The user may request directions to destination point 202. The computer system may initially determine a direct route from point 201 to point 202, represented by the straight line between points 201 and 202. To reduce the probability of losing a wireless connection that may result to by passing through the hole during segment 250, however, the user may be redirected by the system to the alternate route represented by the dotted lines through point 203. Note that this alternate route does not pass through the hole and therefore may improve wireless signal strength.

In accordance with one embodiment of the present invention, the alternate route may be determined by considering the initial route in conjunction with the locations of nearby cell towers. If it is determined that one or more points on the initial route are greater than a predetermined distance from a nearest operating cell tower, an alternate route may be calculated that keeps the cell phone within the predetermined distance, thereby reducing the probability of losing the wireless connection.

For one embodiment, cell tower location information may be transmitted to the cell phone for use in distance calculations to be done by the cell phone. Alternatively, the cell phone may determine cell tower locations based on wireless signal strength. For an alternate embodiment of the present invention, the cell phone may transmit location information to one or more cell towers for distance calculations or rerouting to be done remotely by, for example, a remote server. The results of these calculations may then be wirelessly transmitted back to the cell phone for user guidance.

In accordance with an alternate embodiment of the present invention, information indicating the location of a hole may be transmitted to the cell phone from one or more cell towers that service the cell within which, or near to which, the hole may be located. This embodiment may be found useful for instances in which the hole may be the result of an obstruction of the wireless signal, such as by high voltage power lines, rather than excessive distance from a nearest cell tower. For this embodiment, the cell phone may use this information to guide the user along a route that reduces the probability of losing the wireless connection by, for example, determining a route that avoids the holes.

In accordance with one embodiment of the present invention, if, at block 305 of FIG. 3, it is determined that the user is not traveling along a predesignated route, then it is determined at block 315 if the user's route can be (or should be) predicted. The user's route may be predicted by, for example, extrapolating to a distant point in the direction in which the user is traveling. Alternatively, the user's route may be predicted using historical destination information recorded for the user. For example, based on historical information it may be determined that there is a high probability that the user's destination is "home" if the user is headed in that direction and it is a particular time of the day.

For example, consider, again, a user at point 201 of FIG. 2A. If the user heads in the direction of point 202, the computer system may predict that the user's destination is point 202 and redirect the user to the alternate route through point 203. This may reduce the probability of losing a wireless connection that may result by passing through the hole during segment 250.

In accordance with one embodiment of the present invention, if the route can be predicted at block 315, the user may be redirected to an alternate route, if needed, at block 310.

In accordance with one embodiment of the present invention, if, at block 315 of FIG. 3, it is determined that a route cannot be (or should not be) predicted, then the user may be guided along a route that increases the wireless signal strength at block 320. For example, if the user is stationary while attempting to establish a wireless connection at block 315, it may be difficult to predict a route along which the user intends to travel. Alternatively, a route may not be predicted at block 315 in accordance with a predetermined setting established by a user.

In accordance with this embodiment, a cell phone may simply guide the user to the strongest wireless signal in the vicinity at block 320. For one embodiment, this may involve guiding the user along a route toward the nearest cell tower. For this embodiment, guidance information, including the location of one or more nearby cell towers, may be transmitted to the cell phone. The cell phone may reconcile this information with information indicating the location of the cell phone to determine the appropriate route.

For example, a cell phone user at point 205 of FIG. 2B may be guided toward cell tower 220 to improve the wireless signal strength. Similarly, a cell phone user at point 206 may be guided toward cell tower 225 and a cell phone user at point 207 may be guided toward cell tower 230. In accordance with an embodiment of the present invention in which hole location information is transmitted to the cell phone, the cell phone may use this information to guide the user along a route that avoids the holes.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A system comprising:
    a cell phone to provide a wireless connection;
    a locator to indicate an approximate location of the cell phone; and
    a directional indicator coupled to the cell phone to guide a user along a route that reduces a probability of losing the wireless connection,
    wherein the route includes an alternative route based on a predicted route, the predicted route generated in response to a direction of travel by the user.

2. The system of claim 1, wherein the locator includes a global positioning system.

3. The system of claim 1, wherein the indicator includes an audio or video output device.

4. The system of claim 1, wherein the indicator includes a map of the route.

5. The system of claim 1, further comprising an antenna to receive guidance information used to guide the user along the route.

6. The system of claim 5, wherein the guidance information includes an approximate location of a cell tower.

7. The system of claim 6, further comprising a processor to compare the approximate location of the cell tower to the approximate location of the cell phone to determine the route.

8. A method comprising:
    providing a cell phone with a locator to indicate an approximate location of the cell phone; and
    enabling the cell phone to provide directions to guide a user along a route that improves wireless signal strength,
    wherein the route includes an alternative route based on a predicted route, the predicted route generated in response to a direction of travel by the user.

9. The method of claim 8, wherein enabling the cell phone to provide directions includes providing the cell phone with a display to indicate the route.

10. The method of claim 8, wherein enabling the cell phone to provide directions includes providing the cell phone with an audio or video output device to indicate a location of a nearest cell tower.

11. The method of claim 8, wherein providing the cell phone with the locator includes providing the cell phone with a global positioning system.

12. The method of claim 8, further comprising enabling the cell phone to receive guidance information via an antenna and to use the guidance information to guide the user along the route.

13. The method of claim 12, wherein the guidance information includes an approximate location of a cell tower.

14. The method of claim 8, further comprising enabling the cell phone to predict an initial route of the user and to redirect the user from the initial route to the route that improves wireless signal strength.

15. A system comprising:
    a processor;
    an antenna to provide a wireless connection; and
    a memory region coupled to a cell phone including instructions that, if executed by the processor, cause the system to guide a user along a route that reduces a probability of losing the wireless connection,
    wherein the route includes an alternative route based on a predicted route, the predicted route generated in response to a direction of travel by the user.

16. The system of claim 15, further comprising an audio or video output device and instructions that, if executed by the processor, cause the system to guide the user along the route by providing directional indications to the user via the output device.

17. The system of claim 15, further comprising instructions that, if executed by the processor, cause the system to compare an approximate location of a cell tower to an approximate location of the system to determine the route.

18. The system of claim 15, further comprising instructions that, if executed by the processor, cause the system to predict an initial route of the user and to redirect the user from the initial route to the route that reduces the probability of losing the wireless connection.

* * * * *